May 23, 1967

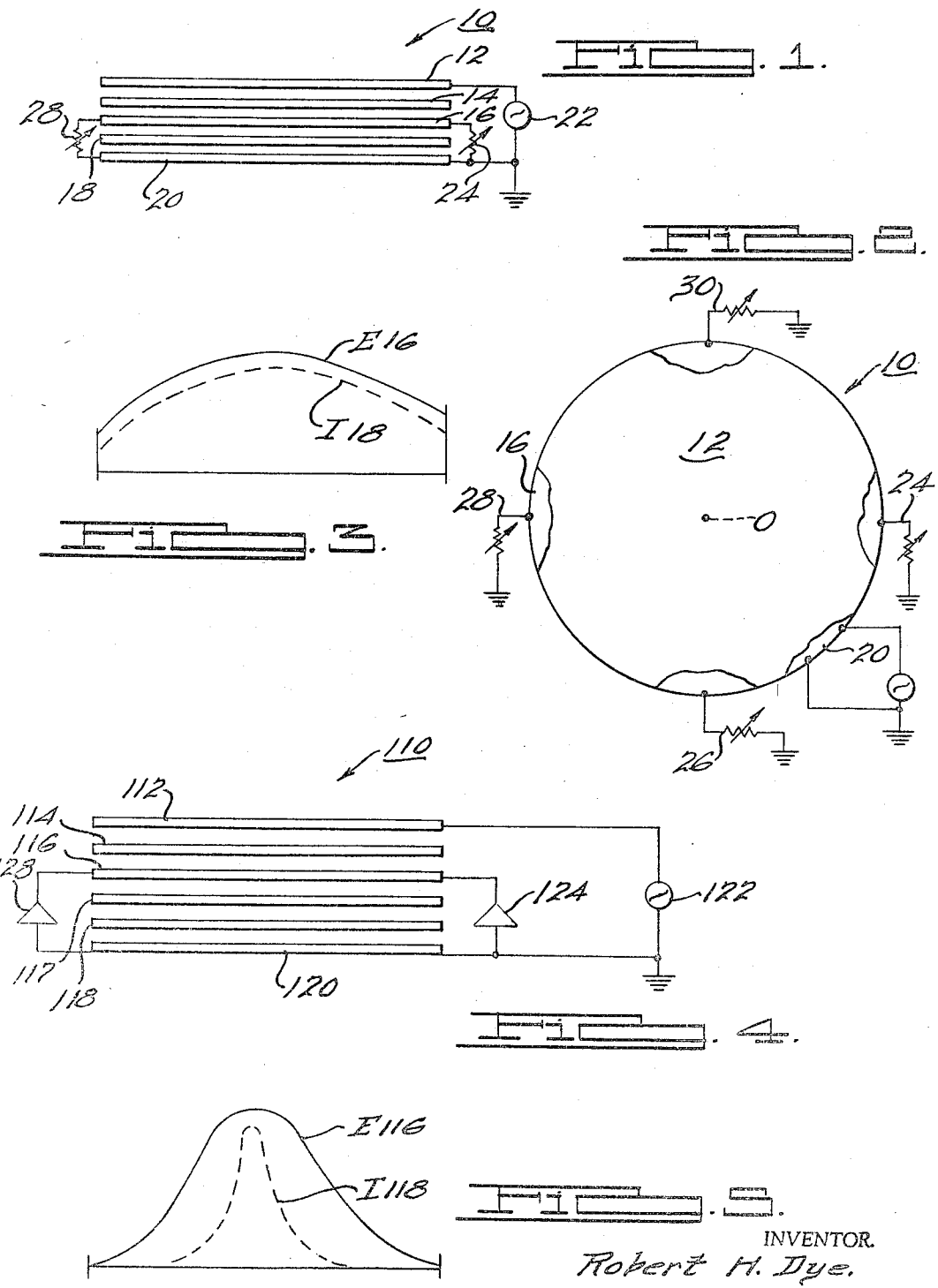

R. H. DYE 3,321,665

METHOD AND APPARATUS FOR PRODUCING
A STEERABLE ELECTRIC POTENTIAL

Filed Oct. 16, 1964

2 Sheets-Sheet 2

INVENTOR.
Robert H. Dye.
BY
James L. O'Brien
ATTORNEY

United States Patent Office 3,321,665
Patented May 23, 1967

3,321,665
METHOD AND APPARATUS FOR PRODUCING A STEERABLE ELECTRIC POTENTIAL
Robert H. Dye, Ann Arbor, Mich., assignor to The Bendix Corporation, Ann Arbor, Mich., a corporation of Delaware
Filed Oct. 16, 1964, Ser. No. 404,471
2 Claims. (Cl. 315—169)

The present invention relates generally to means for producing a steerable electric potential and more particularly to means for controlling and moving the potential distribution on one or more surfaces of a plurality of capacitively related surfaces. The potential distribution on the controlled surface may be controlled in two dimensions to produce a spot or small area of maximum potential; or it may be controlled only in one dimension to give a linear or elongated band of maximum potential. The controlled surface may have a variety of shapes, planar, cylindrical, parabolic, etc. The controlled surface must have a boundary (physical or electrical); but appears to be otherwise unlimited as to shape.

The present invention is particularly useful in information display devices wherein the steerable electric potential may control luminescense of an electroluminescent panel. Although particularly useful in information display devices, the present invention has utility wherever a controlled, movable or steerable potential may be used such as in particle accelerators, analog computation devices, electromagnetic transmission devices, etc.

It is an object of the present invention to provide means for producing an electric potential of defined area on a surface and variably locating said potential on said surface.

It is a further object of the invention to provide in an information display device a steerable electric potential control device for controlling the location of light output.

Another object of the present invention is to provide means for controlling the area of maximum potential of the potential distributed on one surface of a pair of capacitively related surfaces.

Figure 6:
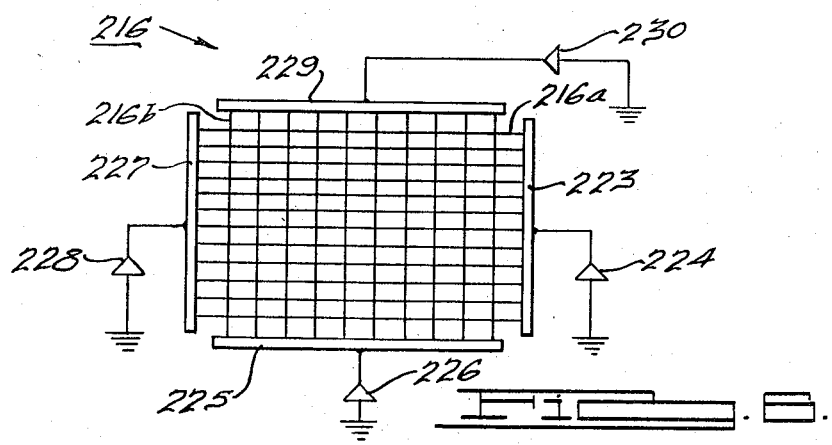
Figure 7:
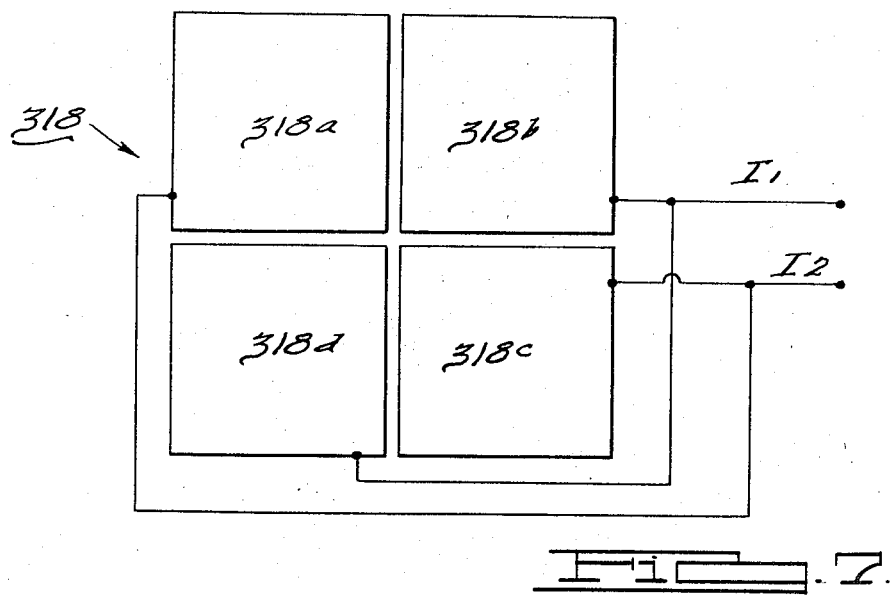

These and other objects and advantages of the present invention will become readily apparent from the following detailed description taken in connection with the appended drawings wherein:

FIGURE 1 is a schematic side view of an information display device embodying the present invention;
FIGURE 2 is a top view of the display device shown in FIGURE 1;
FIGURE 3 is a graph showing the current and voltage distribution on the controlled surface of FIGURE 1 under one condition of operation;
FIGURE 4 is a schematic view of another embodiment of the invention in an information display device;
FIGURE 5 is a graph showing certain characteristics of operation of the embodiment shown in FIGURE 4;
FIGURE 6 is a schematic view of a strip arrangement which may be used in lieu of a solid plate;
FIGURE 7 is a schematic view of a four quadrant multiplier embodying the present invention.

Referring now to the drawings and more particularly to FIGURE 1, numeral 10 designates an information display having a first conducting surface on plate 12 which is made of relatively low resistivity material such as a metal sheet. Numeral 14 designates a dielectric layer or sheet of insulating material which separates a second conducting surface or control surface 16 from the surface 12. The second conducting surface 16 is made of medium resistivity material such as an extremely thin metal foil or deposited metallic film. An electroluminescent panel 18 is located in substantial registration with the second surface 16 on one side and with a transparent conducting surface 20 on the other side. Surface 20 may be made of relatively low resistivity conducting glass or of metallic screen. The various layers or surfaces of display 10 have been shown separated in FIGURE 1 to permit the layers to be more readily identified but in actual practice the adjacent layers are in contact.

A source of alternating electric potential 22 is connected to the outer surfaces 12 and 20 of display 10 to produce an alternating electrical potential gradient between layers 12 and 20. Although alternating potential is preferred from source 22, a direct current power source may be substituted in which case the extremely high resistivity dielectric material in layer 14 would be replaced with a material of somewhat lower resistivity. Four equally spaced voltage control devices 24, 26, 28 and 30 connect the second surface 16 to ground or a reference potential. The voltage control devices 24–30 may be selected from a variety of known devices such as the variable resistors shown in FIGURES 1 and 2 or the variable amplifiers shown in FIGURE 4 and may themselves be controlled manually or by known automatic or programmed control devices (not shown).

The surface 16 tends to assume a potential determined by the ratio of capacitance between surfaces 12 and 16 to the capacitance between surfaces 16 and 20. Current flow from surface 16 to the voltage control devices or resistors 24–30 produces distributed potential drops in surface or layer 16. If the resistors 24–30 are equal, the structural symmetry of the surface requires that the point O in the center of surface 16 experiences no current flow. The point O in surface 16 represents the point of greatest alternating potential with respect to surface 20, since at all other points the current flow produces potential drops in the resistive material of layer 16. The electroluminescent panel 18 gives its brightest light at the point of maximum potential across it, i.e. the point O in the previous example. If the resistances 24–30 are made unequal, the point of zero current of surface 16 will shift toward the point of greatest resistance to ground or reference potential. The shift of the zero current point shifts the point of maximum potential difference with it and consequently shifts the luminous spot or point of brightest light on panel 18. The resistors or other suitable voltage control devices 24–30 may be controlled to position the point of zero current, and the luminous spot, wherever desired.

Referring now to FIGURE 3, the voltage distribution across surface 16 is shown by the solid curve marked $E_{16}$ and the current flow through the electroluminescent panel 18 is shown by the dashed line marked $I_{18}$. As shown, the voltage curve $E_{16}$ has a gradual slope which when applied to an electroluminescent panel 18 not having a sharply defined threshold produces a rather large spot size or a spot not having sharply defined boundaries.

In the embodiment shown in FIGURE 4, the information display 110 has a first conducting surface 112 separated from a second conducting surface 116 by a non-linear dielectric layer 114 made of such material as barium titanate. The controlled surface 116 is separated from the electroluminescent panel 118 by a layer 117 of such material as zinc oxide having the characteristics of offering little resistance to current flow above a rather sharply defined threshold voltage. A source of alternating potential 122 is connected to the first surface 112 and to a transparent conducting surface 120. Voltage control devices 124–130 (only two of which are shown) are provided in a matter similar to that described in the previous embodiment to connect the second surface 116 to ground or reference potential.

The non-linear layer 114 causes the voltage distribution on the controlled surface 116 to have a steeper gradient than in the previous embodiment as best seen by the curve $E_{116}$ in FIGURE 5. The zinc oxide layer 117 causes peaking of the current flow through panel 118 as best seen by the curve $I_{118}$ in FIGURE 5. The effect of layers 114 and 117 is to produce a smaller and more sharply defined luminous spot than in the previous embodiment. The voltage control devices 124–130 provide variable potentials at the boundaries of control surface 116 to control the location of zero current flow, the operation of the display being similar to that previously described in connection with the embodiment shown in FIGURE 1.

Referring now to FIGURE 6, a sheet 216 is shown which may be used as control surface and may be substituted for the surfaces 16 and 116 respectively of the embodiments shown in FIGURES 1 and 4. Sheet 216 is composed of a plurality of parallel conducting fibers 216($a$) of a predetermined resistivity extending in the X direction and plurality of similar fibers 216($b$) extending in the Y direction. The ends of fibers 216($a$) are respectively connected to terminal bars 223 and 227 which are respectively connected to voltage control devices 224 and 228.

Similarly the ends of fibers 216($b$) are connected to terminal bars 225 and 229 and to voltage control devices 226 and 230.

In operation of the device shown in FIGURE 6, the voltage control devices 224 and 228 are regulated to produce a band of zero current flow in fibers 216($a$) which may be moved in the X direction by controlling the potentials at the ends of the fibers. Similarly a movable band of zero current flow in fiber 216($b$) can be controlled by regulating voltage control devices 226 and 230. The overlap of the bands in fibers 216($a$) and 216($b$) when the sheet is used with the surfaces of the previous embodiments and the potential source produce a spot or area of voltage potential which may be steered or moved on the sheet. The steerable voltage potential may be used to energize an electroluminescent panel or may be used for other purposes such as described below.

One such purpose is in connection with a four quadrant multiplier shown in FIGURE 7. The controlled surfaces 16, 116 and 216 of the previous embodiments may be placed in capacitive registration with multiplier plate 318 which is separated into four sections 318$a$, $b$, $c$ and $d$. Sections 318($b$) and ($d$) are connected as shown and have an output designated by $I_1$. Sections 318($a$) and ($c$) are connected as shown and have an output designated by $I_2$. If the point of maximum potential O is centered on the controlled surfaces 16, 116 and 216, the point O will have equal registration with the four sections and the capacitive current output from the sections will be such that $I_1$ equals $I_2$. Shifting of the point O with respect to the center of plate 318 causes the current flow from the sections to vary as a function of the area of the section overlapped by the point O such that $I_1-I_2=K(X.Y)$.

While my invention has been described with reference to specific embodiments, it will be readily apparent to those skilled in the art that various changes and modifications may be made without departing from the scope of my invention.

I claim:
1. An information display comprising:
    a first conducting surface,
    a second conducting surface having a boundary and a predetermined resistivity,
    a dielectric layer separating said first and second surfaces,
    an electroluminescent panel in substantial registration with said second surface,
    a transparent conducting third surface disposed on the opposite side of said panel from said second surface,
    a source of electric potential connected to said first and third surfaces, and
    a plurality of voltage control devices connecting equally spaced points along the boundary of said second surface with a reference potential.
2. An information display comprising:
    a first conducting surface,
    a second conducting surface having a boundary and a predetermined resistivity,
    a dielectric layer separating said first and second surfaces,
    an electroluminescent panel in substantial registration with said second surface,
    a non-linear conducting third surface disposed between said second surface and said panel,
    a transparent conducting fourth surface disposed outwardly adjacent to said panel,
    a source of electric potential connected to said first and fourth surfaces, and
    a plurality of voltage control devices connecting equally spaced points along the boundary of said second surface with a reference potential.

References Cited by the Examiner
UNITED STATES PATENTS

| | | | |
|---|---|---|---|
| 3,039,013 | 6/1962 | Wilmotte | 315—169 |
| 3,102,970 | 9/1963 | Haskell et al. | 315—169 X |
| 3,130,348 | 4/1964 | Lieb | 315—169 X |
| 3,154,720 | 10/1964 | Cooperman | 315—169 |

JAMES D. KALLAM, *Primary Examiner.*

D. O. KRAFT, A. J. JAMES, *Assistant Examiners.*